3,606,253
PORTABLE VEHICLE RACK
Dupree Wooten and Robert Wooten, both of
9401 W. William St., Rosemont, Ill. 60018
Filed Jan. 26, 1970, Ser. No. 5,730
Int. Cl. E02c 3/00
U.S. Cl. 254—88                                     5 Claims

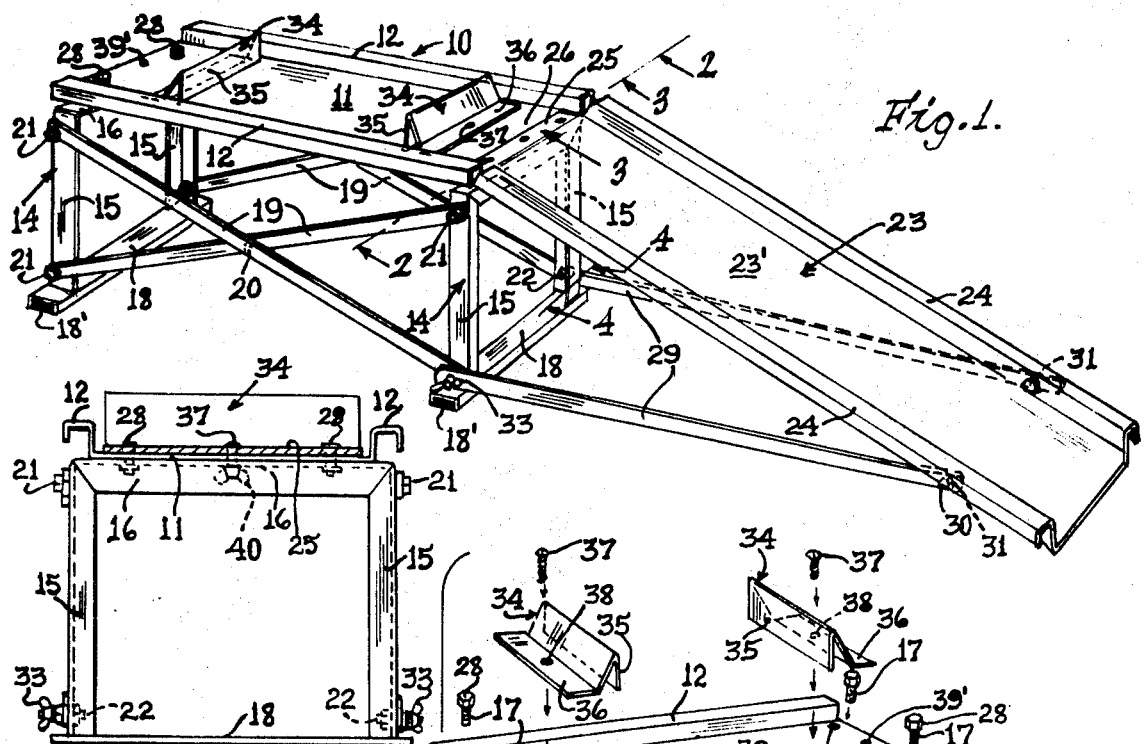
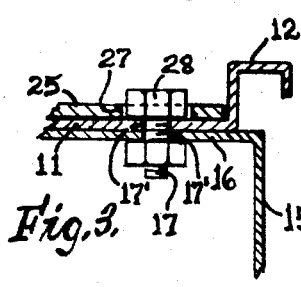
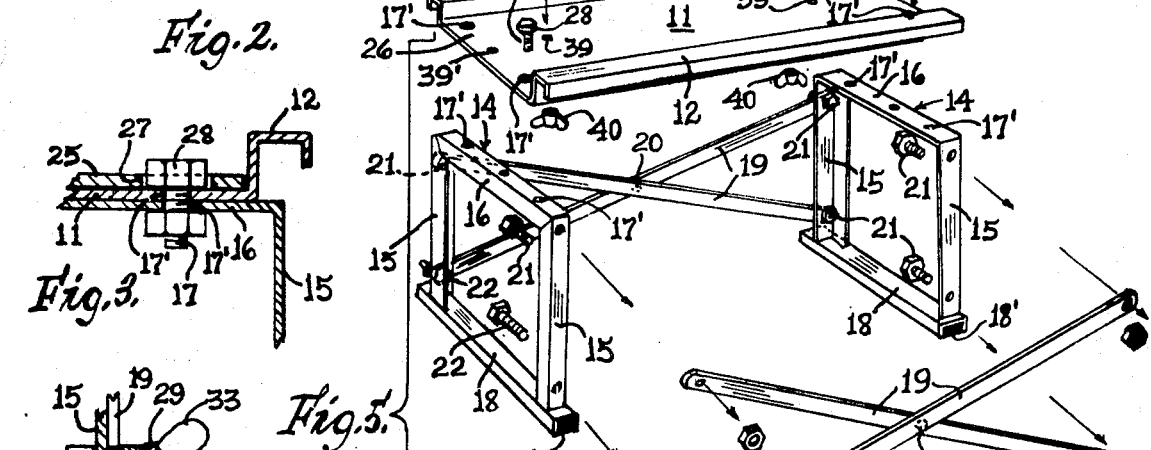
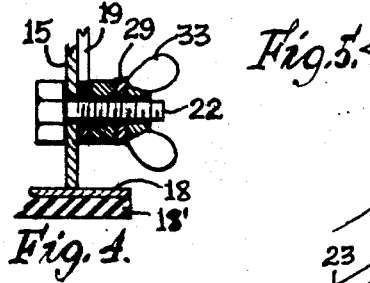
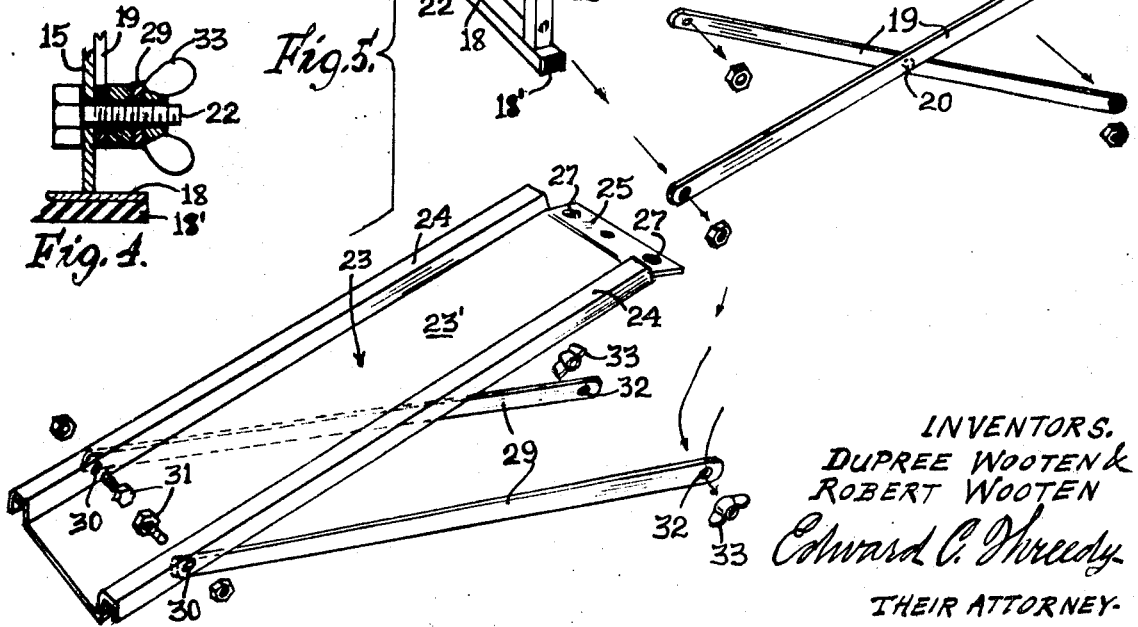

ABSTRACT OF THE DISCLOSURE

A portable vehicle rack having a platform provided at opposite ends with safety blocks and having an inclined ramp attached to either end of the platform and removable therefrom to permit free access to the underside of the vehicle being serviced or repaired, the rack being capable of being disassembled when not in use to facilitate storage thereof.

SUMMARY OF THE INVENTION

Our improved vehicle rack is of a relatively simple yet durable sustaining structure capable of being used in connection with supporting one end of an automobile or other vehicle, such, for example, as a tractor, go-cart, power mower, snowblower, golf cart, and the like, which require service and repair. The vehicle rack is of such a structure as to permit the user to mount the same in position to support a vehicle or the like with the minimum degree of effort and labor. The vehicle rack is provided with an inclined ramp which may be detachably connected to either end of the rack to guide a wheel of the vehicle to a position upon the rack between adjustable safety blocks which engage opposite sides of the wheel to prevent displacement of the wheel from the rack.

GENERAL DESCRIPTION

In use, there may be employed two racks, one for each of the front or rear wheels of the vehicle, as the case may require. The vehicle rack embodied in our invention is best illustrated in the accompanying drawings showing the preferred form of construction, and in which:

FIG. 1 is a perspective view of our improved vehicle rack;

FIG. 2 is a sectional detail view taken substantially on line 2—2 of FIG. 1;

FIG. 3 is a fragmentary sectional detail view taken substantially on line 3—3 of FIG. 1;

FIG. 4 is a fragmentary sectional detail view taken substantially on line 4—4 of FIG. 1;

FIG. 5 is a perspective view of the several elements making up our improved rack, showing the same in exploded relation with respect to each other.

Referring more particularly to the drawings, 10 indicates the rack. Such rack includes an elongated plate 11 which has its longitudinally extending side edges 12 channel-shaped in cross section and extending above the plate 11. Such channel-shaped edges 12 strengthen the plate 11 and provide opposite longitudinal guides for the vehicle wheel. The plate 11 is supported by oppositely disposed end frames 14 each of which comprises vertical bars 15 and a top bar 16 formed substantially L-shaped in cross section. The top bar 16 is connected to the plate 11 by means of nut-bearing bolts 17 projected through openings 17' formed in the top bar 16 and plate 11. The side or vertical bars 15 at their lower end portions are secured by welding or the like to a base or foot plate 18. These plates 18 are channel-shaped in cross section and may have mounted in the channels thereof a non-skid member 18', such as rubber pads or the like.

The end frames 14 are tied together by cross bars 19 welded together in pairs at their point of intersection as indicated at 20. The end portions of the crossbars 19 are connected to the vertical bars 15 by means of nut-receiving bolts 21 and 22. The bolts 22 are of greater length than the bolts 21 for reasons hereinafter set forth.

A ramp is indicated generally at 23. Such ramp is formed from an elongated plate 23' of substantial rigidity and includes side edge portions 24 which are formed channel-shaped in cross section and extend a predetermined distance above the plate 23' so as to provide guide rails for the wheel of a vehicle or the like when moving along the ramp, which guide rails are in alignment with the guide rails provided by the side edges 12 of the ramp plate 11.

One end portion 25 of the ramp 23 is bent out of the plane of the plate 23' in an extended horizontal position so as to engage flatly upon the adjacent end portion 26 of the rack plate 11. The end portion 25 of the ramp 23 is provided with oppositely disposed openings 27 which are of a diameter larger than the heads 28 of the bolts 17 so that when the ramp 23 has its end portion 25 positioned on the adjacent end portion 26 of the rack plate 11, the heads 28 of the bolts 17 will project into the openings 27 to thus hold the plate 23' in proper relation with respect to the rack 10 and to permit quick removal of the ramp 23 when desired. The ramp end portion 25 may be attached to either end of the rack plate 11.

Elongated tie bars 29 have corresponding end portions connected as at 30 by nut-bearing bolts 31 to the side edge portions 24 of the lower end of the ramp 23 (FIGS. 1 and 5). The opposite end portions of the tie bars 29 are provided with openings 32 through which project the ends of the bolts 22, the bolts 22 being of a sufficient length to permit mounting thereon of the tie bars 29 and threading thereon of wing nuts 33 as shown in FIG. 4. The use of the wing nuts 33 permits quick and easy removal of the tie bars 29 from their connection with the vertical frame bars 15 of the rack 10.

To complete the invention, we removably mount on the rack plate 11 spaced safety blocks 34. Each safety block 34 provides an upstanding portion which is substantially triangular in cross section to provide a vertically extending face 35 which engages the adjacent wheel of the vehicle to block movement thereof on the rack 10. These blocks 34 each have a horizontal flange 36 which is attached to the rack plate 11 by nut-bearing bolts 37 which project through openings 38 and 39 formed respectively in the horizontal flange 36 and the plate 11. A wing nut 40 is threaded on each of these bolts 37, facilitating quick removal of the safety blocks 34 to permit their positioning upon the plate 11 to enlarge the space between the blocks. When this is accomplished, the bolts 37 project through openings 39' formed in the plate 11. By this arrangement, the safety blocks 34 may be mounted in one of two positions upon the plate 11.

The material from which our improved vehicle rack is formed is of substantially rigid material so as to withstand the weight of a vehicle thereon. When in use, the ramp 23 may be removed from the rack 10 so as to afford free access to the under structure of the vehicle, thus greatly facilitating making repairs or servicing the same, such as changing oil or lubricating the vehicle. When not in use, the ramp may be easily and quickly detached from the rack and the disassembled parts may be conveniently stored.

The assembly of the rack with its inclined ramp may be accomplished by any person without any special tools or training.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A portable vehicle rack including
  (a) an elongated relatively flat rack plate having opposite longitudinal edges formed substantially channel-shaped in cross section and extending above the plane of the plate to provide opposite longitudinal guides,
  (b) end frames for supporting said rack plate in an elevated horizontal plane, said end frames each comprising vertical bars and a top bar substantially L-shaped in cross section and a base plate connected to said vertical bars and formed substantially channel-shaped in cross section,
  (c) crossbars extending longitudinally with respect to said rack plate and connecting said end frames together,
  (d) and an inclined ramp removably connected to said rack plate and one of said end frames and formed of an elongated relatively flat plate extending downwardly and forwardly from one end of said rack plate and having opposite longitudinal side edges formed substantially channel-shaped in cross section and extending above the plane of the ramp plate to provide longitudinal guides disposed in alignment with the guides of the rack plate.

2. The portable vehicle rack defined by claim 1 characterized by the inclusion of tie bars extending on opposite sides of the ramp with corresponding end portions connected to the opposite end portions of the ramp, and opposite corresponding end portions of said tie bars removably connected to one of the end frames.

3. The portable vehicle rack defined by claim 1 characterized by the inclusion of stop blocks mounted on and extending transversely of the rack plate.

4. The portable vehicle rack defined by claim 2 characterized by the inclusion of stop blocks mounted on and extending transversely of the rack plate.

5. The portable vehicle rack defined by claim 1 wherein the removable connection between the rack plate and the ramp comprises bolts connecting the rack plate to an adjacent top bar of one of said end frames, and enlarged openings formed in said ramp into which the heads of said bolts project to restrain forward movement of the ramp plate with respect to the rack.

References Cited

UNITED STATES PATENTS

| | | | |
|---|---|---|---|
| 1,855,949 | 4/1932 | Dubroca | 254—88 |
| 1,879,123 | 9/1932 | Davis | 254—88 |
| 2,924,427 | 2/1960 | Larson | 254—88 |
| 3,102,714 | 9/1963 | Lindal | 254—88 |

OTHELL M. SIMPSON, Primary Examiner